United States Patent [19]

Gardner

[11] 4,277,142
[45] Jul. 7, 1981

[54] PERISCOPIC MIRROR

[76] Inventor: Billy R. Gardner, 3825 Wilshire, Abilene, Tex. 79603

[21] Appl. No.: 138,926

[22] Filed: Apr. 10, 1980

[51] Int. Cl.³ .............................................. G02B 7/18
[52] U.S. Cl. .................................................... 350/302
[58] Field of Search .............................. 350/301–304, 350/307; 74/501 M

[56] References Cited

U.S. PATENT DOCUMENTS

| | | | |
|---|---|---|---|
| 2,645,159 | 7/1953 | Darroch | 350/302 |
| 2,963,936 | 12/1960 | Court | 350/286 |
| 2,979,989 | 4/1961 | Calder | 350/304 |
| 3,003,396 | 10/1961 | Jenkins | 350/307 |
| 3,485,555 | 12/1969 | Norris | 350/302 |
| 3,494,687 | 2/1970 | Weiner | 350/179 |
| 3,674,921 | 4/1954 | Williams | 350/302 |
| 3,788,735 | 11/1974 | Rowley | 350/302 |
| 3,806,233 | 4/1974 | Stefano | 350/303 |
| 3,846,016 | 11/1974 | Firstenberg | 350/302 |
| 3,856,383 | 12/1974 | Yamashita et al. | 350/302 |
| 3,915,567 | 10/1975 | Ermlich | 350/301 |
| 4,114,989 | 9/1978 | Badgley | 350/302 |

FOREIGN PATENT DOCUMENTS 1319563  1/1963  France ...................................... 350/304

Primary Examiner—Jon W. Henry
Attorney, Agent, or Firm—Wofford, Fails & Zobal

[57] ABSTRACT

A periscopic mirror for a high degree of visibility for a driver of a vehicle characterized by a structure carrying first and second mirrors and a third set of mirrors, all coordinated so as to present to the driver a view rearwardly and to the sides of the vehicle. The first mirror is a lower and adjustable mirror that can be adjusted by the driver to compensate for disparities in height and sitting positions. The second mirror is disposed so as to reflect the line of sight of the driver from the first mirror onto the third set of mirrors. The third set of mirrors have a central rearview mirror for reflecting rearwardly of the vehicle and right and left wing mirrors for reflecting sidewise and downwardly so as to reflect the view to the left and downward and right and downward sides of the vehicle back to the driver for providing substantially one hundred and eighty degrees of visibility. Also disclosed are preferred embodiments such as transparent sections of a housing, a housing for being affixed exteriorly of the automobile and the like.

2 Claims, 4 Drawing Figures

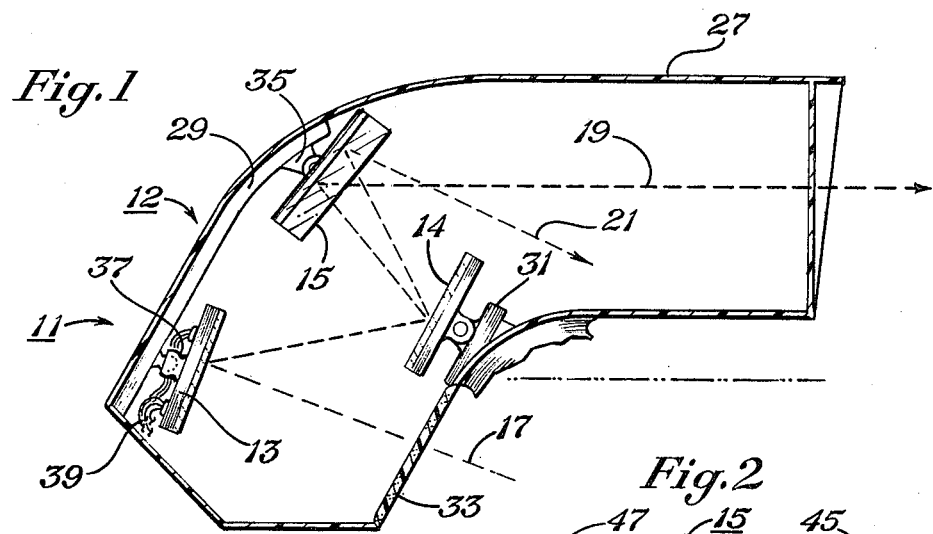
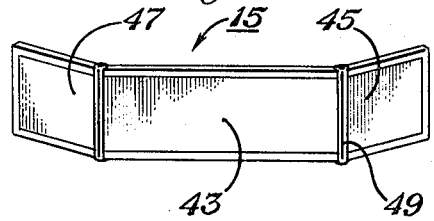
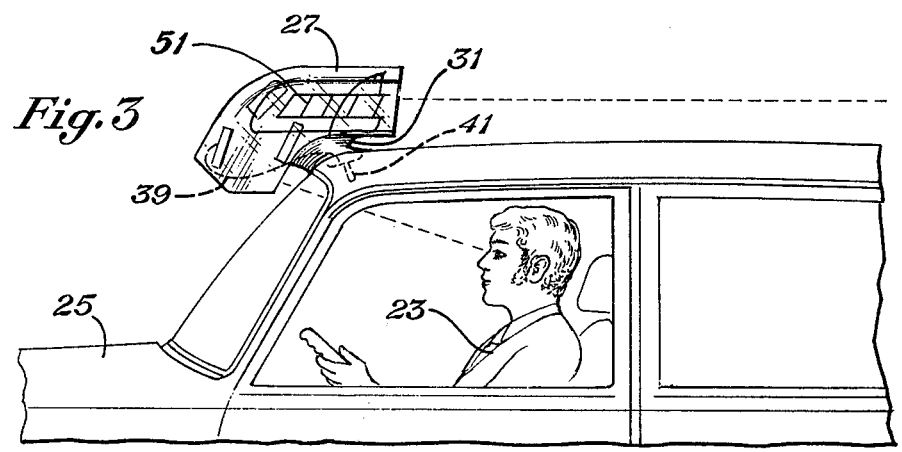
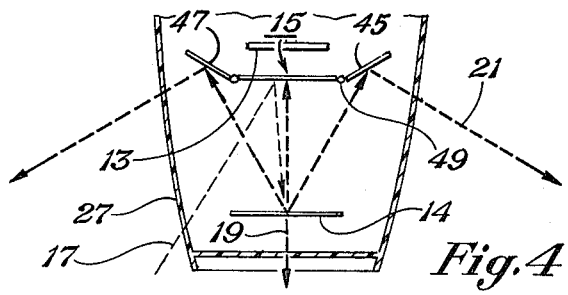

PERISCOPIC MIRROR

FIELD OF THE INVENTION

This invention relates to a rearvision mirror apparatus for a vehicle such as an automobile. More particularly, it relates to a rearvision apparatus of the periscopic type having a rearview window and having sidewise viewing mirrors to enable the driver to have a clear view to the rear and sides of the vehicle.

DESCRIPTION OF THE PRIOR ART

The prior art is replete with a wide variety of different types of rearwardly viewing mirrors for vehicles such as automobiles. Typical of the prior art are the following U.S. Pat. Nos. 2,963,936 shows a rearview means having a prismatic rearview window. 3,003,396 shows a convex mirror that gives a wide field angle. 3,485,555 shows an auxiliary rearview mirror system for vehicles consisting of V-shaped mirrors mounted inside the vehicle immediately above a conventional rearview mirror and set to focus on outside mirrors such as beyond the tailgate of a station wagon. 3,494,689 shows a combined rearview mirror and sun visor. 3,645,607 shows a split image rearview system consisting of a primary mirror, convex, cylindrical or flat mounted in a vehicle for viewing through rear and side windows by conventional means and also providing a periscopic option of seeing above the top of the car. 3,788,735 shows a rearview mirror system consisting of a primary conventional type mirror adjusted to focus on a secondary mirror mounted inside the vehicle and providing the capability of periscopic viewing over the top of the vehicle. 3,846,016 shows peripheral rearview mirrors for an automobile in which a dash mounted reflector reflects onto a outside mounted mirror at the top of the automobile. 3,806,233 describes a multiface automobile rearview mirror system in which multiple facets are employed for breaking the view up into a plurality of small views. 3,856,383 shows a rearview mirror apparatus for an automobile consisting of a combination of three mirrors, two of which are enclosed in a shroud and the other suspended from a lower portion of the shroud and set to focus and providing rearviewing capability over the top of the automobile. 3,915,562 shows a rearview system for an automobile consisting of a primary conventional type mirror adjusted to focus on secondary mirrors mounted inside the environmental window in the roof which is, in turn preset to focus on a third mirror for rearward viewing over the top of the vehicle.

Thus it can be seen that, although crowded, the prior art did not provide the capability of viewing throughout a one hundred and eighty degree sector by the driver, including view of the sides and downwardly from the vehicle so as to make safe exiting onto ramps from a high speed freeway or the like.

SUMMARY OF THE INVENTION

Accordingly, it is an object of this invention to provide a periscopic mirror that obviates the disadvantages of the prior art structure and provides a high degree of visibility such that the driver of an automobile experiences a high degree of safety.

It is a specific object of this invention to provide periscopic mirror assembly that enables the driver to see not only rearwardly, but to the sides of his vehicle and substantially throughout one hundred and eighty degrees from his position.

These and other objects will become apparent from the descriptive matter hereinafter, particularly when taken in conjunction with the appended drawings.

In accordance with this invention, there is provided a periscopic mirror for a high degree of visibility for a driver of a vehicle comprising:
  a. structure adapted for carrying a plurality of mirrors and adapted to be affixed to the vehicle;
  b. a first lower, adjustable mirror carried by the structure, facing the driver and adjustable to reflect onto a second mirror;
  c. a second mirror disposed rearwardly of the structure and the first mirror; the second mirror being mounted so as to reflect the sight of the driver from the first lower, adjustable mirror to a third set of mirrors; and
  d. a third set of mirrors carried by the structure; the third set of mirrors including a rearview mirror and respective right and left wing mirrors. The rearview mirror is adapted and positioned to reflect the view rearwardly of the vehicle to the driver by way of the second and first mirrors. The right wing mirror is adapted and positioned to reflect the view to the right and downward side of the vehicle to the driver. The left wing mirror is adapted and positioned to reflect the view to the left and downward side of the vehicle to the driver. In this way, the driver has substantially a hundred and eighty degree of visibility for an unusually high degree of safety in operating his vehicle.

BRIEF DESCRIPTION OF DRAWINGS

FIG. 1 is a cross sectional view of a housing structure and mirror arrangement in accordance with one embodiment of this invention.

FIG. 2 is an isometric view of the third set of mirrors of the embodiment of FIG. 1.

FIG. 3 is a partial side elevational view showing the embodiment of FIG. 1 installed on the front roof of an automobile.

FIG. 4 is a top plan view of a typical reflected line of sight array of an embodiment of this invention.

DESCRIPTION OF THE PREFERRED EMBODIMENTS

Referring to FIG. 1, the periscopic mirror apparatus 11 includes a structure 12, a lower adjustable mirror 13, a second mirror 14, and a third set of mirrors 15. The periscopic mirror arrangement reflects the line of sight, shown by dashed lines 17, rearwardly and to each side of the vehicle, shown by respective dashed lines 19 and 21 to give the driver 23, FIG. 3 of the vehicle 25 a clear field of vision rearwardly and to the sides of his vehicle 25. This array is shown more clearly in FIG. 4 and will be understood from the following descriptive matter.

The structure 12 may comprise any suitable structure for holding the mirrors in a predetermined relationship as described later hereinafter. As illustrated, the structure 12 includes a transparent housing 27, FIGS. 1, 3 and 4 and an internal frame work 29, 31, supporting the respective mirrors. If desired, of course, the housing 27 may only be transparent rearwardly of the third set of mirrors 15 in order to allow visibility to the sides and rearwardly of the vehicle. Having the housing transparent facilitates cleaning, rather than having to reach inside the housing and cleaning the mirrors. The transparent housing is not absolutely necessary, however, if suitable chute type openings are provided for visibility or if the mirrors are left accessible for cleaning. Preferably, the housing is adapted to be affixed onto the vehicle, as by a base 31, FIG. 3 having suitable fluid-tight gaskets or the like and having a passageway therethrough for cables for adjusting the lower, adjustable mirror. It is advantageous to have the front part of the housing opaque to eliminate glare and the like; although the housing is more readily constructed of a unitary material such as lucite, polyethylene or other castable plastic. Of course, any opaque portions can be formed of metal and/or painted black or other means employed to eliminate light reflections. In any event, the housing must have a transparent section, or open chutes, to afford a reflected view to the driver. The housing 27 also must include a transparent driver section 33, FIG. 1, so that the line of drivers sight 17 can see the reflection in mirror 13.

The internal frame work 29 may comprise any suitably structrually strong framework; including plastic, such as the acrylonitrile butadiene styrene copolymer (ABS), or metallic framework, such as steel or aluminum. As illustrated it is formed of a metallic framework such as aluminum, which is affixed, as by being adhesively bonded to the housing. The internal framework includes suitable mounting brackets 35 and 37 for mounting the third set of mirrors and the lower adjustable mirror. As can be seen, the bracket 35 fixedly holds the third set of mirrors in place, although it can be adjusted by going interiorly of the housing. On the other hand, the bracket 37 adjustably holds the lower, adjustable mirror 13 in place. The lower bracket 37 is a conventional bracket such as employed on the outside mirrors on conventional automobiles. A suitable adjusting cable 39 extends to an interiorly mounted adjusting lever 41 for adjusting the mirror. As is known, such adjusting cables and levers comprise three single-wire cables mounted at one hundred and twenty degrees about the center of the mirror so as to pull the mirror in the desired direction responsive to movement of the lever 41 in the desired direction. This allows adjustment of the lower, adjustable mirror 13.

Preferably, the first, adjustable mirror 13 is a substantially planar mirror that presents a true image and may have a conventional rearview mirror construction. The first lower, adjustable mirror 13 is carried by the structure facing the driver and is adjustable to reflect the line of sight of the driver onto a second mirror.

The second mirror 14 is disposed rearwardly of the structure and of the first mirror 13. The second mirror is mounted so as to reflect the sight of the driver from the first lower, adjustable mirror to a third set of mirrors. The second mirror 14 may have a conventional mirror construction and be mounted semi-rigidly to its bracket 31, although it may be adjusted by going inside the housing.

The third set 35 of mirrors comprises a rearview mirror 43, FIGS. 2 and 4, and respective right and left wing mirrors 45 and 47. The rearview mirror is adapted and positioned to reflect the view rearwardly of the vehicle in an expanding angle of sight rearwardly of the driver. The view is reflected to the driver by way of second and first mirrors such that the image is properly oriented as the driver expects to see in a conventional rearview mirror orientation. If desired, the rearview mirror 43 can be convex to afford a wider field of vision. Preferably, however, it is substantially planar to present a relatively correctly sized and relatively correctly oriented view such as the driver is used to experiencing.

The respective right and left wing mirrors are pivotally connected with the respective ends of the rearview mirror 43, as by hinge mounts 49. Hinge mounts 49 are tight such that the respective wing mirrors are held in place once they are positioned and placed inside the housing 27. If desired, the respective wing mirrors can be convex for a wider field of vision. It has been found preferable, however, to employ substantially planar mirrors to provide a correct orientation and size relationship between the reflected view of objects. The latter is particularly preferred if the rearview mirror 43 is a planar mirror.

In operation, the mirrors are assembled and affixed to the internal framework 29 and 31 which has been affixed to the housing 27. The housing and its space are then assembled in fluid-tight relationship to the top of the vehicle, as by being bonded in place with water tight seals, affixed by screws through the roof, or the like. Preferably, an apperture is made for the inclusion of the interior lever 41 for adjusting the lower, adjustable mirror 13 and the lever installed with the cables connected with the mirror. As can be seen in FIG. 3, the housing is preferably mounted at the forward portion of the roof near the center with at least the first lower, adjustable mirror 13 visible to the driver through the windsheild. Thereafter, the driver adjusts the lower, adjustable mirror to get the proper reflection and drives with a wide degree of visibility. While the dashed line and arrow of FIGS. 1, 3 and 4 are illustrative only, it is apparent to one skilled in this art that movement of the drivers head allows the line of sight reflections to be varied almost infinitely throughout substantially one hundred and eighty degrees of vision from the third set of mirrors 15.

If desired, chrome fittings can be employed over the hinges on the third set of mirrors to improve the visibility. Moreover, borders can be employed about one or more of the sets of mirrors.

If desired, the structure may be installed on a sun visor or on bars that are affixed exteriorly of the car, or vehicle and not sealed to the windshield. On the other hand, if desired, the housing may be sealingly affixed to a windshield with a properly designed mount.

For best all weather visibility defogging apparatus for defrosting or defogging is preferably included. Any of the conventional defoggers that will work in the periscopic mirror can be employed. The preferred comprises unobtrusive, electrically heated wires 51, FIG. 3, embedded in the regions where transparency is required; similarly as is used in auto rear windows.

From the foregoing, it can be seen that this invention achieves the objects delineated hereinbefore. Specifically, the periscopic mirror assembly of this invention provides an exceptionally high degree of visibility to the driver so that he can see rearwardly of and on either side of his vehicle.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. A periscopic mirror for excellent visibility of a driver of a vehicle both rearwardly and to the sides of the vehicle comprising:
   a. a structure carrying a plurality of mirrors and affixed exteriorly of the vehicle; said structure including a housing with transparent rear and side sections for preventing getting said mirrors dirty without restricting visibility; said housing being mounted near the center of the roof of said vehicle and having a lower mirror below the top of a windshield of the vehicle so as to be visible to the driver;
   b. said first lower, adjustable mirror being disposed interiorly of and carried by said structure and facing the driver and adjustable to reflect a second mirror; said lower, adjustable mirror being connected with the an elongate adjusting means for adjusting the mirror to the line of eyesight of the driver; said elongate adjusting means being disposed interiorly of the vehicle and accessible to the driver;
   c. a second mirror disposed rearwardly of said structure and said first mirror; said mirror being mounted so as to reflect the line of sight of the driver from said first lower, adjustable mirror to a third set of mirrors; and
   d. a third set of mirrors carried by said structure; said third set including a rearview mirror and respective right and left wing mirrors; said rearview mirror being positioned and adapted to reflect the view rearwardly of said vehicle to the driver via said second and first mirrors; said right wing mirror being adapted and positioned to reflect the view to the right and downward side of said vehicle to the driver via said second and first mirrors; said left wing mirror being adapted and positioned to reflect the view to the left and downward side of said vehicle to the driver via said second and first mirrors;

such that substantially one hundred and eighty degrees of visibility is assessible to the driver for an exceptionally high degree of safety.

2. The periscopic mirror of claim 1 wherein said housing includes defogging means for maintaining transparency in the required areas and minimizing obscured visibility due to inclement weather conditions.

* * * * *